(12) United States Patent
Didat et al.

(10) Patent No.: US 11,050,380 B2
(45) Date of Patent: Jun. 29, 2021

(54) PHASE CONTROL OF DC BUS IN APPLIANCES

(71) Applicant: Haier US Appliance Solutions, Inc., Wilmington, DE (US)

(72) Inventors: Mark Anthony Didat, Floyds Knobs, IN (US); Steven Andrew Rice, Shelbyville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 307 days.

(21) Appl. No.: 15/841,464

(22) Filed: Dec. 14, 2017

(65) Prior Publication Data

US 2019/0190429 A1   Jun. 20, 2019

(51) Int. Cl.
| | |
|---|---|
| *H02P 27/06* | (2006.01) |
| *D06F 37/30* | (2020.01) |
| *D06F 39/00* | (2020.01) |
| *D06F 39/08* | (2006.01) |
| *D06F 37/06* | (2006.01) |
| *D06F 39/02* | (2006.01) |
| *D06F 23/02* | (2006.01) |
| *H02M 7/155* | (2006.01) |
| *H02M 1/32* | (2007.01) |
| *H02M 7/06* | (2006.01) |
| *H02M 5/22* | (2006.01) |
| *H02M 1/36* | (2007.01) |
| *D06F 33/00* | (2020.01) |

(Continued)

(52) U.S. Cl.
CPC ............ *H02P 27/06* (2013.01); *D06F 23/02* (2013.01); *D06F 33/00* (2013.01); *D06F 34/28* (2020.02); *D06F 37/06* (2013.01); *D06F 37/304* (2013.01); *D06F 39/022* (2013.01); *D06F 39/085* (2013.01); *D06F 39/088* (2013.01); *H02M 1/32* (2013.01); *H02M 1/36* (2013.01); *H02M 5/22* (2013.01); *H02M 7/06* (2013.01); *H02M 7/1557* (2013.01); *H02M 2001/007* (2013.01); *Y02B 40/00* (2013.01)

(58) Field of Classification Search
CPC ........ H02M 1/32; H02M 5/22; H02M 7/1557; H02M 1/36; H02M 7/06; H02M 2001/007; D06F 39/088; D06F 23/02; D06F 33/00; D06F 37/06; D06F 39/022; D06F 34/28; D06F 39/085; D06F 37/304; H02P 27/06; Y02B 40/00
See application file for complete search history.

(56) References Cited

U.S. PATENT DOCUMENTS 4,584,507 A * 4/1986 Taylor .................. H02P 23/0077
                                                              388/813
5,077,512 A * 12/1991 Weber ..................... H02P 25/04
                                                              318/729

(Continued)

*Primary Examiner* — Benjamin L Osterhout
(74) *Attorney, Agent, or Firm* — Dority & Manning, P.A.

(57) ABSTRACT

A control system of an appliance having a motor is provided. The control system includes an inverter circuit configured to provide power to the motor. The inverter circuit has a direct-current (DC) bus. The control system further includes a controller device powered by the DC bus, and a phase fired control device operatively coupled to an input of the inverter circuit. Also, the phase fired control device is configured to control a magnitude of voltage applied to the DC bus based on a phase on angle of the phase fired control device.

15 Claims, 5 Drawing Sheets

(51) Int. Cl.
*D06F 34/28* (2020.01)
*H02M 1/00* (2006.01)

(56) References Cited

U.S. PATENT DOCUMENTS

| | | |
|---|---|---|
| 8,896,288 B2 | 11/2014 | Choi et al. |
| 2004/0139767 A1* | 7/2004 | Weinmann ............ H02P 25/14 68/12.16 |
| 2009/0261744 A1 | 10/2009 | Chen et al. |
| 2011/0198922 A1* | 8/2011 | Dames .................. H02J 5/00 307/18 |

* cited by examiner

PHASE CONTROL OF DC BUS IN APPLIANCES

FIELD

The present subject matter relates generally to control of washing machine appliances and, in particular, to phase control of DC buses of washing machine appliances.

BACKGROUND

Generally, washing machine appliances can include a cabinet with a wash tub mounted therein. A wash basket is rotatably mounted within the wash tub and receives articles for washing. During operation of the appliance, a motor coupled to the wash basket may be powered on while washing fluid (e.g., water and/or detergent) is used to clean articles disposed within the wash basket. For example, after a user makes selections regarding wash and rinse cycles at a control panel, the washing machine operates one or more valves to fill the wash tub with a certain amount of water. Additives such as detergent and fabric softeners may also be added manually or automatically to the water to form the washing fluid.

The wash tub may be drained and filled several times depending upon the wash and rinse cycles selected or programmed for the cleaning process. In addition, washing fluid may be circulated through the wash tub during wash or rinse cycles to assist in cleaning articles disposed in the wash basket. After cessation or completion of wash cycles, a motor of the washing machine appliance may need to be stopped completely for safety reasons. Additionally, a controller or other circuitry may also need to be in a standby state to await further commands from an end user.

However, many controllers, control panels, motors, and circuitry associated with washing machine appliances may be powered with direct current (DC), while power to the washing machine appliance may be supplied at 120 or 240 volts of Alternating Current (AC). Accordingly, inverters or other rectification circuitry may be used to supply the DC power to the washing machine appliances. In these instances, a DC bus may remain powered at full capacity to power the motor and washing machine appliance, or may be de-energized completely to avoid potential safety hazards after operation. However, if the DC bus is completely de-energized, the controller or other circuitry may also be de-energized resulting in a black-out condition.

Additionally, if the power to the DC bus is de-energized and re-energized multiple times to attempt to avoid blackout conditions, power and/or filter capacitors associated with motor control may be damaged. It can be appreciated that these power and/or filter capacitors constitute a large value and damage may result in costly repairs to the washing machine appliances.

BRIEF DESCRIPTION

Aspects and advantages of the invention will be set forth in part in the following description, or may be obvious from the description, or may be learned through practice of the invention.

An example aspect of the present disclosure is directed to a control system for an appliance having a motor. The control system includes an inverter circuit configured to provide power to the motor. The inverter circuit has a direct-current (DC) bus. The control system further includes a controller device powered by the DC bus, and a phase fired control device operatively coupled to an input of the inverter circuit. Also, the phase fired control device is configured to control a magnitude of voltage applied to the DC bus based on a phase on angle of the phase fired control device.

Another example aspect of the present disclosure is directed to a washing machine appliance. The washing machine appliance includes a cabinet, a wash tub supported in said cabinet, a wash basket rotatably mounted in said wash tub and coupled to a motor, and a control system. The control system includes an inverter circuit configured to provide power to the motor. The inverter circuit has a direct-current (DC) bus. The control system further includes a controller device powered by the DC bus, and a phase fired control device operatively coupled to an input of the inverter circuit. Also, the phase fired control device is configured to control a magnitude of voltage applied to the DC bus based on a phase on angle of the phase fired control device.

Another example aspect of the present disclosure is directed to a method of phase control of an appliance having a motor. The method includes receiving a command to control the appliance and turning on or off a phase fired control device based on the command. The method further includes determining if a set of criteria is indicative of a motor off but controller on state. In this instance, the method includes varying a phase on angle of the phase fired control device to power a DC bus at a reduced or regulated level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In example aspects, a control system for an appliance having a motor is provided. The control system includes an inverter circuit configured to provide power to the motor. The inverter circuit has a direct-current (DC) bus. The control system further includes a controller device powered by the DC bus, and a phase fired control device operatively coupled to an input of the inverter circuit. Also, the phase fired control device is configured to control a magnitude of voltage applied to the DC bus based on a phase on angle of the phase fired control device. Related control systems for other appliances are also provided.

Figure 1:
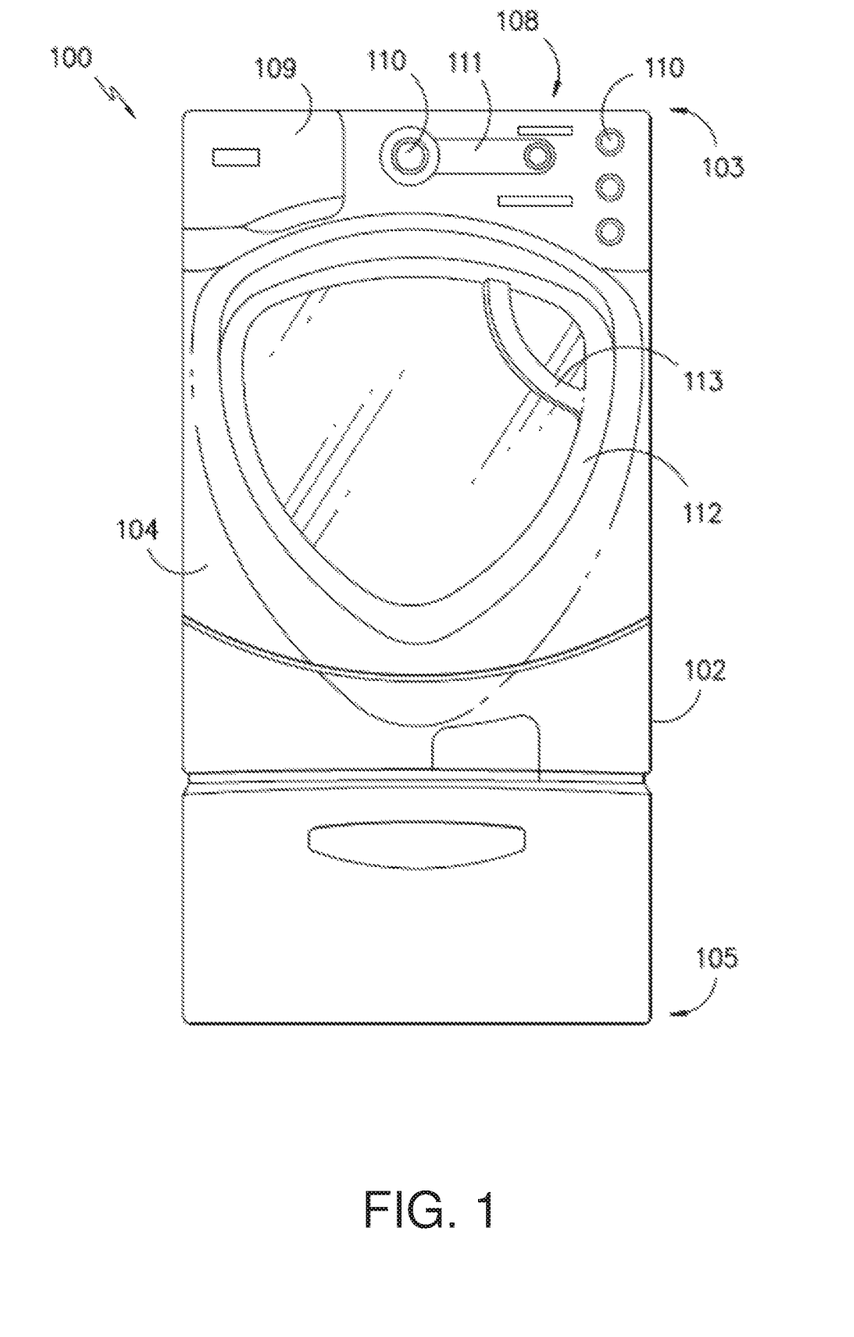
FIG. 1 provides a front view of a washing machine appliance.
Figure 2:
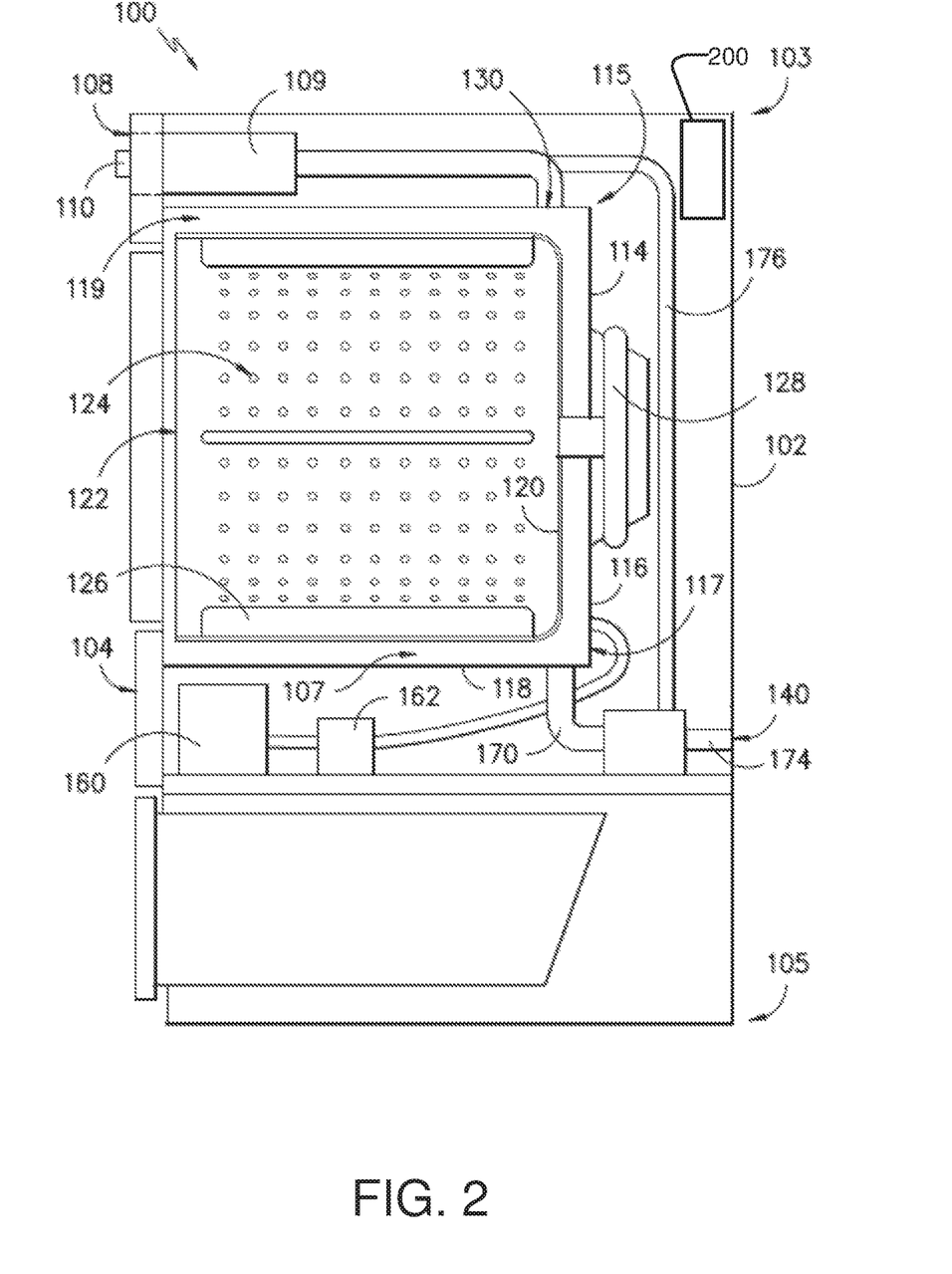
FIG. 2 illustrates a cross-sectional view of the washing machine appliance of FIG. 1 and, in particular, interior electronics including a control panel.

FIG. 1 is a front view of an example horizontal axis washing machine appliance 100 having a cabinet 102. FIG. 2 is a side cross-sectional view of washing machine appliance 100. Cabinet 102 extends between a top 103 and a bottom 105. Cabinet also includes a front panel 104. A door 112 is mounted to front panel 104 and is rotatable about a hinge (not shown) between an open position (not shown) facilitating access to a wash basket 120 (FIG. 2) located within cabinet 102, and a closed position (FIG. 1) prohibiting access to wash basket 120. A user may pull on a handle 113 in order to adjust door 112 between the open position and the closed position.

A control panel 108 including a plurality of input selectors 110 is coupled to front panel 104. Control panel 108 and input selectors 110 collectively form a user interface input for operator selection of machine cycles and features. For example, in one embodiment, a display 111 indicates selected features, a countdown timer, and/or other items of interest to machine users.

Referring now to FIG. 2, a wash tub 114 defines a wash compartment 119 configured for receipt of a washing fluid. Thus, wash tub 114 is configured for containing washing fluid. Washing fluid disposed in wash tub 114 may include, e.g., water, fabric softener, bleach, and/or detergent. Wash tub 114 includes a back wall 116 and a sidewall 118 and also extends between a top 115 and a bottom 117.

Wash basket 120 is rotatably mounted within wash tub 114 in a spaced apart relationship from tub sidewall 118 and the tub back wall 116. Basket 120 defines an opening 122 for receiving articles for washing. Basket 120 also defines a plurality of perforations 124 to facilitate fluid communication between an interior of basket 120 and wash tub 114. A sump 107 is defined by wash tub 114 and is configured for receipt of washing fluid during operation of appliance 100. For example, during operation of appliance 100, washing fluid may be urged by gravity from basket 120 to sump 107 through plurality of perforations 124.

A spout 130 is configured for directing a flow of fluid into wash tub 114. Spout 130 may be in fluid communication with a water supply (not shown) in order to direct fluid (e.g., clean water) into wash tub 114. Spout 130 may also be in fluid communication with the sump 107. For example, a pump assembly may direct washing fluid disposed in sump 107 to spout 130 in order to circulate washing fluid in wash tub 114. In alternative example embodiments, a spray nozzle (not shown) can be mounted adjacent door 112, e.g., within a gasket (not shown) of door 112. The spray nozzle may operate in a similar manner to spout 130 in order to direct fluid into wash tub 114. Spout 130 and/or the spray nozzle may be mounted at any suitable location within washing machine appliance 100 in order to direct fluid into wash tub 114.

A pump assembly may be located beneath tub 114 for draining tub 114 of fluid via sump 107. The sump 107 is also in fluid communication with a drain 140 via piping 174. Fluid received by drain 140 from the pump assembly can be directed out of appliance 100, e.g., to a sewer or septic system. In addition, washing fluid within wash tub 114 may be recirculated using an alternative assembly not illustrated herein. For example, a pump assembly may urge washing fluid in sump 107 to spout 130 and the spray nozzle (not shown) via hose 176 during operation of appliance 100 in order to assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of washing machine appliance 100 as described below. Ribs 126 extend from basket 120 into wash compartment 119. Ribs 126 assist agitation of articles disposed within wash compartment 119 during operation of washing machine appliance 100. For example, ribs 126 may lift articles disposed in basket 120 during rotation of basket 120.

A drawer 109 is slidably mounted within front panel 104. Drawer 109 receives a fluid additive (e.g., detergent, fabric softener, bleach, or any other suitable liquid) and directs the fluid additive to wash compartment 119 during operation of appliance 100. Additionally, a reservoir 160 is disposed within cabinet 102. Reservoir 160 is also configured for receipt of fluid additive for use during operation of washing machine appliance 100 (shown in FIG. 1). Reservoir 160 is sized such that a volume of fluid additive sufficient for a plurality or multitude of wash cycles of appliance 100 may fill reservoir 160. Thus, for example, a user can fill reservoir 160 with fluid additive and operate appliance 100 for a plurality of wash cycles without refilling reservoir 160 with fluid additive. A reservoir pump 162 is configured for selective delivery of the fluid additive from reservoir 160 to wash tub 114.

Operation of washing machine appliance 100 is controlled by a controller or processing device 200, that is operatively coupled to control panel 108 (FIG. 1) for user manipulation to select washing machine cycles and features. In response to user manipulation of control panel 108, the controller operates the various components of washing machine appliance 100 to execute selected machine cycles and features.

In an illustrative embodiment, laundry items are loaded into wash basket 120, and washing operation is initiated through operator manipulation of input selectors 110. Wash tub 114 is filled with water and detergent to form a wash fluid. One or more valves (not shown) can be controlled by washing machine appliance 100 to provide for filling wash tub 114 to the appropriate level for the amount of articles being washed. Once wash tub 114 is properly filled with fluid, the contents of wash basket 120 are agitated with ribs 126 for cleansing of laundry items in basket 120.

After the agitation phase of the wash cycle is completed, wash tub 114 is drained. Laundry articles can then be rinsed by again adding fluid to wash tub 114, depending on the particulars of the cleaning cycle selected by a user, ribs 126 may again provide agitation within wash compartment 119. One or more spin cycles may also be used. In particular, a spin cycle may be applied after the wash cycle and/or after the rinse cycle in order to wring wash fluid from the articles being washed. During a spin cycle, basket 120 is rotated at relatively high speeds.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, the teachings disclosed herein may be used with other appliances as well, e.g., a dishwasher appliance, a cooking range appliance, a garbage disposal appliance, and other suitable appliances having a DC bus.

Figure 3:
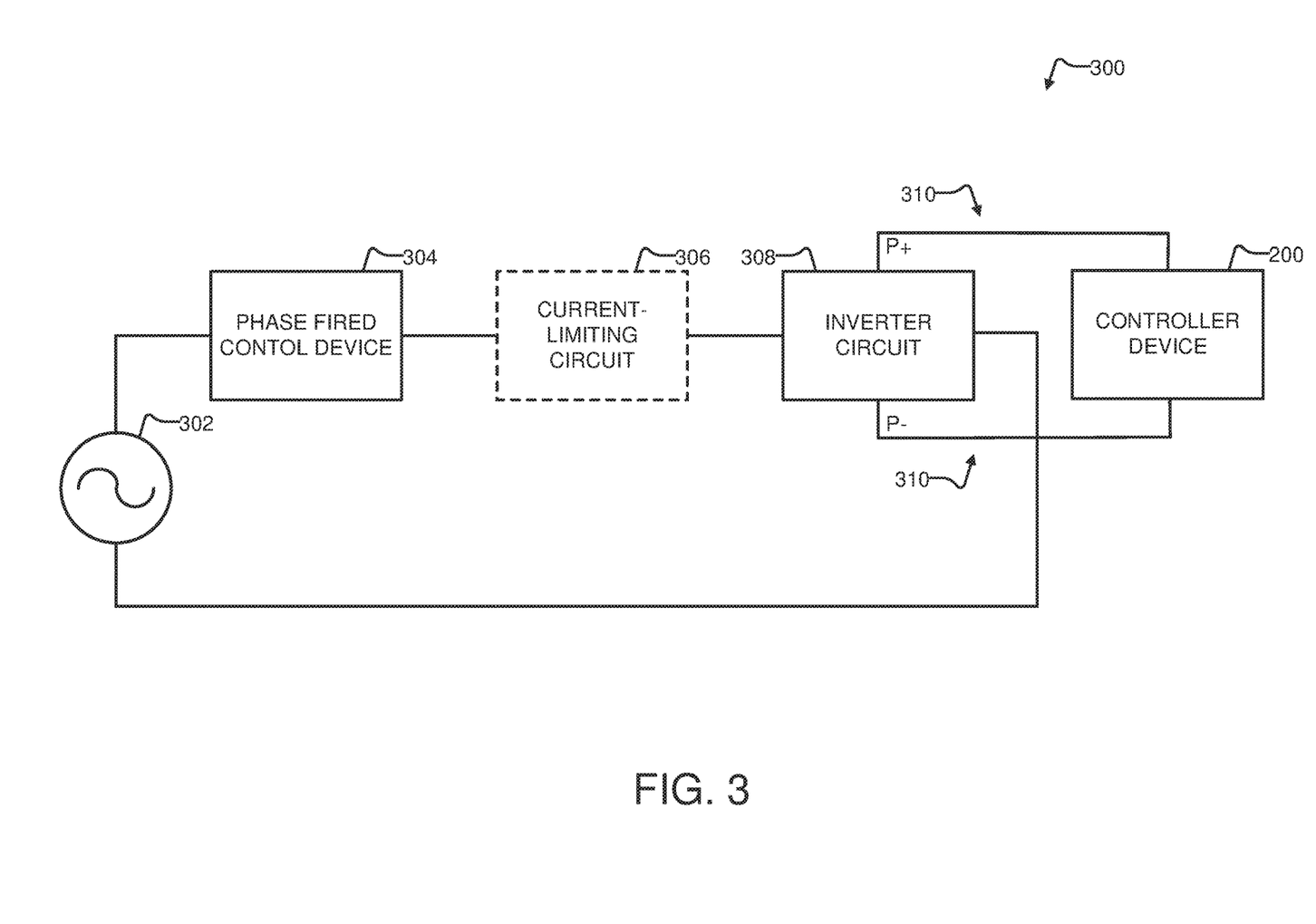
FIG. 3 illustrates a schematic of a control system for an appliance having a motor according to example embodiments of the present disclosure.

After cessation or completion of wash cycles, the motor 128 of the washing machine appliance 100 may need to be stopped completely for safety reasons. Additionally, the controller 200 and other control circuitry may also need to be in a standby state to await further commands from an end user, for example, through the control panel 108. Turning now to FIG. 3, a schematic of a control system 300 for an appliance having a motor, is illustrated. Generally, it should be appreciated that the control system 300 can be implemented in the washing machine appliance 100, or in any other suitable appliance as described above. Furthermore, the control system 300 may overcome many drawbacks associated with alternative controls for de-energizing DC buses in appliances.

As illustrated in FIG. 3, the control system 300 includes AC power source 302 configured to supply AC power to the control system 300. For example, the AC power source may be a residential power outlet or other power source.

The control system 300 further includes a phase fired control device 304 coupled to the AC power source 302. The phase fired control device 304 may include any suitable phase fired control device. For example, the phase fired control device 304 may include a bidirectional triode thyristor or bilateral triode thyristor (e.g., TRIAC). Alternatively, the phase fired control device can include a silicon controlled rectifier or a gate turn-off thyristor.

As further illustrated in FIG. 3, the control system 300 includes an inverter circuit 308 coupled to the phase fired control device 304 and the AC power source 302. The inverter circuit 308 is configured to provide power to the motor (e.g., motor 128). Additionally, the inverter circuit 308 includes a direct-current (DC) bus 310. The DC bus 310 can provide power to the controller device 200. The inverter circuit 308 may supply power to the DC bus 310, and may include a rectifier, voltage multiplier, and/or other suitable circuitry. According to at least one embodiment, the inverter circuit 308 can include a bridge rectifier.

Generally, during operation, the control system 300 receives control signals from the controller device 200 or other control device to operate the phase fired control device 304. For example, the phase on angle of the phase fired control device 304 controls a peak voltage across the inverter circuit 308. The phase on angle may be controllably applied by the controller device 200 or another control device (not illustrated for clarity). Through manipulation of the phase on angle of the phase fired control device 304, the peak voltage across the inverter circuit 308 can be reduced, thereby reducing the voltage of the DC bus 310 to any value between 0 VDC and $N*V_{PEAK}$ of the AC power source 302, where N is a voltage multiplier and $V_{PEAK}$ is the peak (as opposed to RMS) voltage of the AC power source 302. According to example embodiments, the multiplier N is the value 2. According to other embodiments, the multiplier N is determined by the inverter circuit 308 and a number of voltage doublers contained therein.

Accordingly, bulk, power, or filter capacitors associated with the DC bus 310 may be controllably charged while controlling the phase on angle of the phase fired control device 304. Additionally, the voltage of the DC bus 310 can be reduced to safe standby levels that retain enough power to successfully keep the controller device 200 powered-on without a blackout condition. Other current-limiting features may also be optionally included to further increase the longevity of capacitors, as described below.

The control system 300 can also optionally include a current-limiting circuit 306 operatively coupled between the phase fired control device 304 and the inverter circuit 308. The current-limiting circuit 306 may be configured to further limit a charging current associated with charging bulk, filter, or power capacitors associated with powering the DC bus 310 and the motor (e.g., motor 128). According to one embodiment, the current-limiting circuit 306 comprises a resistance and a bypass. Thus, the resistance may limit current during charging, while the bypass may bypass the resistance while the appliance is in a fully operational state.

Thus, as described above, bulk, filter, or power capacitors associated with motor control of the appliance may be controllably charged and their longevity increased. Furthermore, the DC voltage of the DC bus 310 may be reduced considerably, thereby increasing safety while still powering the controller device 200 without a blackout condition.

Figure 4:
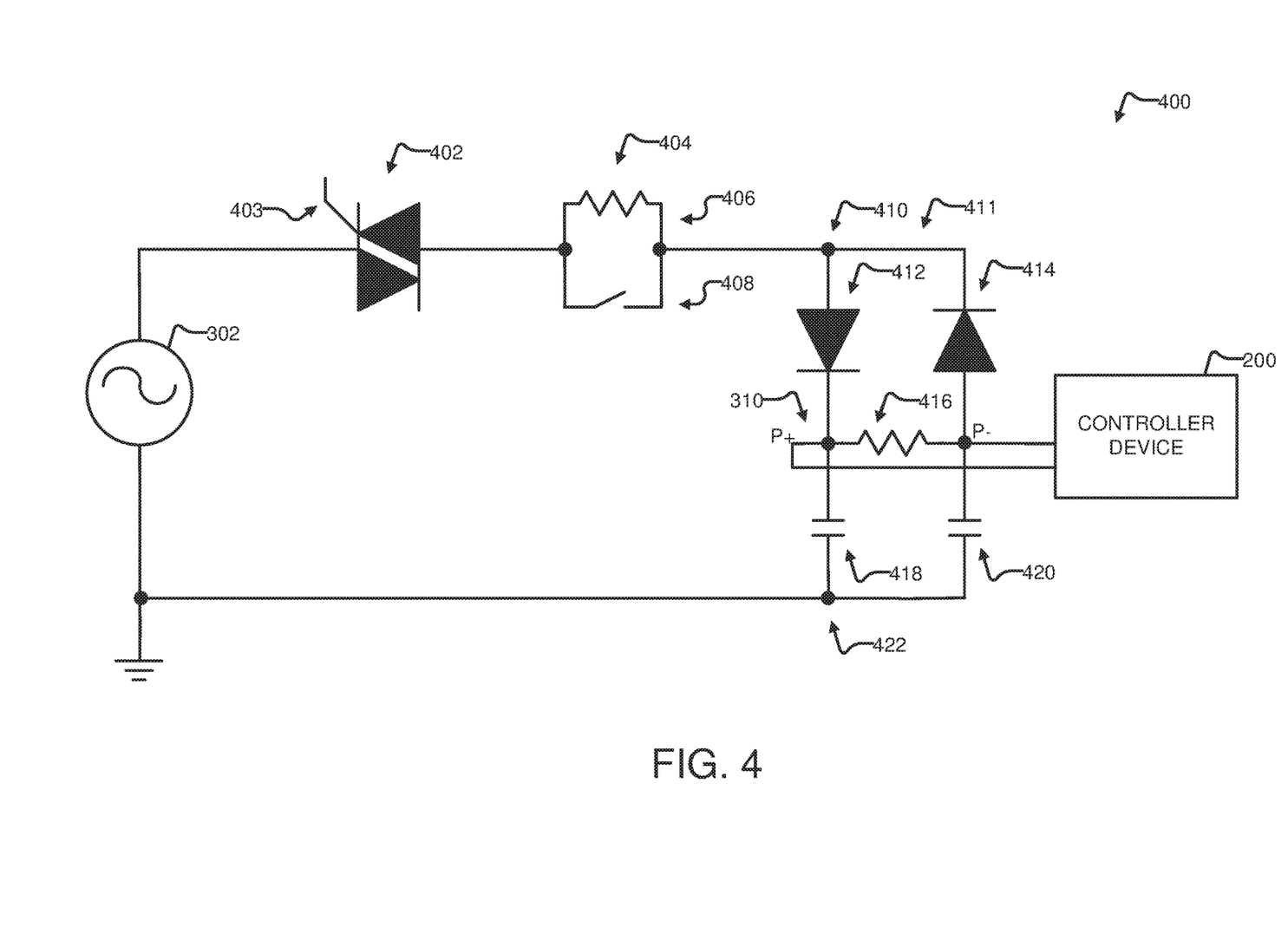
FIG. 4 illustrates a detailed schematic a control system for an appliance having a motor according to example embodiments of the present disclosure.

FIG. 4 illustrates a detailed schematic a control system 400 for an appliance having a motor, according to an additional embodiment of the present subject matter. As shown, the control system 400 can also receive power from AC source 302.

The control system 400 includes a TRIAC 402 coupled to the AC power source 302. The TRIAC 402 comprises a gate electrode 403 for controlling the phase on angle of the TRIAC 402 by the controller device 200. As further shown in FIG. 4, the control circuit 400 includes a current limiting circuit 404 having a resistance 406 and a bypass 408. Furthermore, the current-limiting circuit 404 is coupled to the TRIAC 402 and the inverter circuit 411. The inverter circuit 411 includes at least two diodes 412 and 414 coupled to first node 410 and at least two capacitors 418 and 420 coupled to second node 422. Furthermore, the inverter circuit 411 includes a resistance 416 coupled between DC rails of the DC bus 310.

It should be readily understood that the TRIAC 402 can be controlled as described above with reference to FIG. 3. Additionally, DC voltage of the DC bus 310 may be controllably reduced to avoid potential safety issues while also eliminating a blackout condition of the controller device 200. Accordingly, the control system 400 may have similar technical benefits and technical effects as the control system 300. Hereinafter, operational details of the control systems 300 and 400 are presented with reference to FIG. 5.

Figure 5:
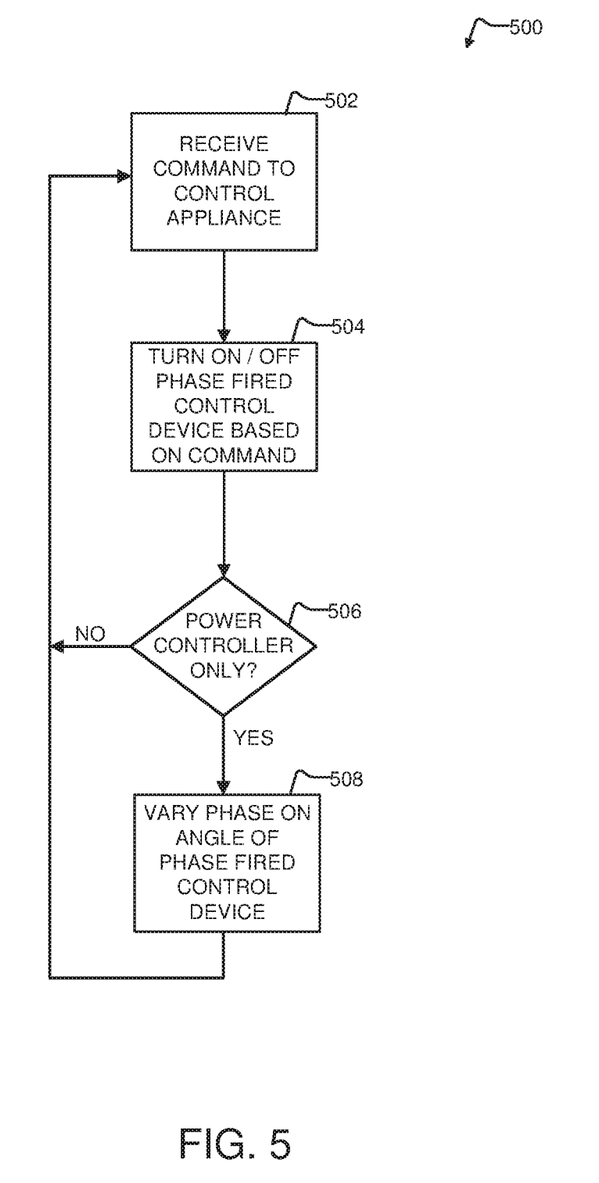
FIG. 5 is a flow diagram of a method of phase control of a DC bus of an appliance having a motor according to example embodiments of the present disclosure.

FIG. 5 is a flow diagram of a method 500 of phase control of a DC bus of an appliance having a motor, according to an embodiment of the present subject matter. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 500 are described herein as being implemented, at least in part, by system components, which can comprise a control application, controller, component and/or a circuit. In some configurations, the system components include functionality produced by an application programing interface (API), a compiled program, an interpreted program, a network service, a script or any other executable set of instructions.

Although the following illustration refers to the components of FIG. 3, it can be appreciated that the operations of the method 500 may be also implemented in many other ways. For example, the method 500 may be implemented, at least in part, by a processor of a remote controller or a local circuit. In addition, one or more of the operations of the method 500 may alternatively or additionally be implemented, at least in part, by a chipset working alone or in conjunction with software modules. Any service, circuit or application suitable for providing the techniques disclosed herein can be used in operations described herein.

As shown in FIG. 5, the method 500 includes receiving a command to control the appliance 100 from a control panel 108 of the appliance 100, at block 502. For example, the command may include a power-down command directing the controller circuit to power-down the appliance 100 to a standby state or powered-down state.

The method 500 further includes turning on or off a phase fired control device 304 based on the command, at block 504. For example, the controller device 200 may apply a gate voltage to the phase fired control device 304 to turn the device on or off.

The method 500 further includes determining if a set of criteria is indicative of a controller-only-on state responsive to the turning on or off, at block 506. The method 500 further includes varying a phase on angle of the phase fired control device 304 to power the DC bus 310 at a reduced level based on the determination, at block 508.

It should be appreciated that the operational blocks of method 500 may not exhaustively describe all aspects of appliance control. These operational blocks may be a simplified operational flow chart describing only partial aspects of appliance control, and should not be construed of illustrating all possible control scenarios.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system of an appliance having a motor comprising:
   an inverter circuit configured to provide power to the motor, the inverter circuit having a direct-current (DC) bus;
   a controller device powered by the DC bus;
   a phase fired control device operatively coupled to an input of the inverter circuit, wherein the phase fired control device is configured to control a magnitude of voltage applied to the DC bus based on a phase on angle of the phase fired control device; and
   a current-limiting circuit operatively coupled between the phase fired control device and the inverter circuit, wherein the current-limiting circuit comprises a resistance and a bypass that bypasses the resistance while the appliance is in a fully operational state, and wherein the resistance limits current during charging of bulk capacitors, filter capacitors, or power capacitors associated with the DC bus and the motor.

2. The system of claim 1, wherein the phase fired control device is a bilateral triode thyristor.

3. The system of claim 1, wherein the phase on angle of the phase fired control device controls a peak voltage across the inverter circuit.

4. The system of claim 1, wherein the current-limiting circuit is configured to bypass the resistance in response to a first set of criteria.

5. The system of claim 1, wherein the current-limiting circuit is configured to reduce current through the inverter circuit in response to a second set of criteria.

6. The system of claim 1, wherein the controller device is configured to receive DC power from the DC bus at a regulated level based on the phase on angle of the phase fired control device.

7. The system of claim 1, wherein the inverter circuit comprises at least two diodes coupled to a first node and at least two capacitors coupled to a second node.

8. The system of claim 1, wherein the DC bus is supplied a multiple of a voltage amplitude of an AC power source in response to phase on angle control of the phase fired control device.

9. The system of claim 1, wherein the controller device is associated with controlling the motor.

10. A washing machine appliance, comprising:
    a cabinet;
    a wash tub supported in said cabinet;
    a wash basket rotatably mounted in said wash tub and coupled to a motor; and
    a control system, comprising:
       an inverter circuit configured to provide power to the motor, the inverter circuit having a direct-current (DC) bus;

a controller device powered by the DC bus;

a phase fired control device operatively coupled to an input of the inverter circuit, wherein the phase fired control device is configured to control a magnitude of voltage applied to the DC bus based on a phase on angle of the phase fired control device; and a current-limiting circuit operatively coupled between the phase fired control device and the inverter circuit, wherein the current-limiting circuit comprises a resistance and a bypass that bypasses the resistance while the appliance is in a fully operational state, and wherein the resistance limits current during charging of bulk capacitors, filter capacitors, or power capacitors associated with the DC bus and the motor.

11. The washing machine appliance of claim 10, wherein the phase fired control device is a bilateral triode thyristor.

12. The washing machine appliance of claim 10, wherein the phase on angle of the phase fired control device controls a peak voltage across the inverter circuit.

13. The washing machine appliance of claim 10, wherein the current-limiting circuit is configured to bypass the resistance in response to a first set of criteria.

14. The washing machine appliance of claim 10, wherein the current-limiting circuit is configured to reduce current through the inverter circuit in response to a second set of criteria.

15. The washing machine appliance of claim 10, wherein the controller device is configured to receive DC power from the DC bus at a regulated level based on the phase on angle of the phase fired control device.

* * * * *